2 Sheets—Sheet 1.
G. W. BILLINGS.
PROCESS OF AND MACHINE FOR CASTING STEEL INGOTS.
No. 10,082. Reissued Apr. 11, 1882.
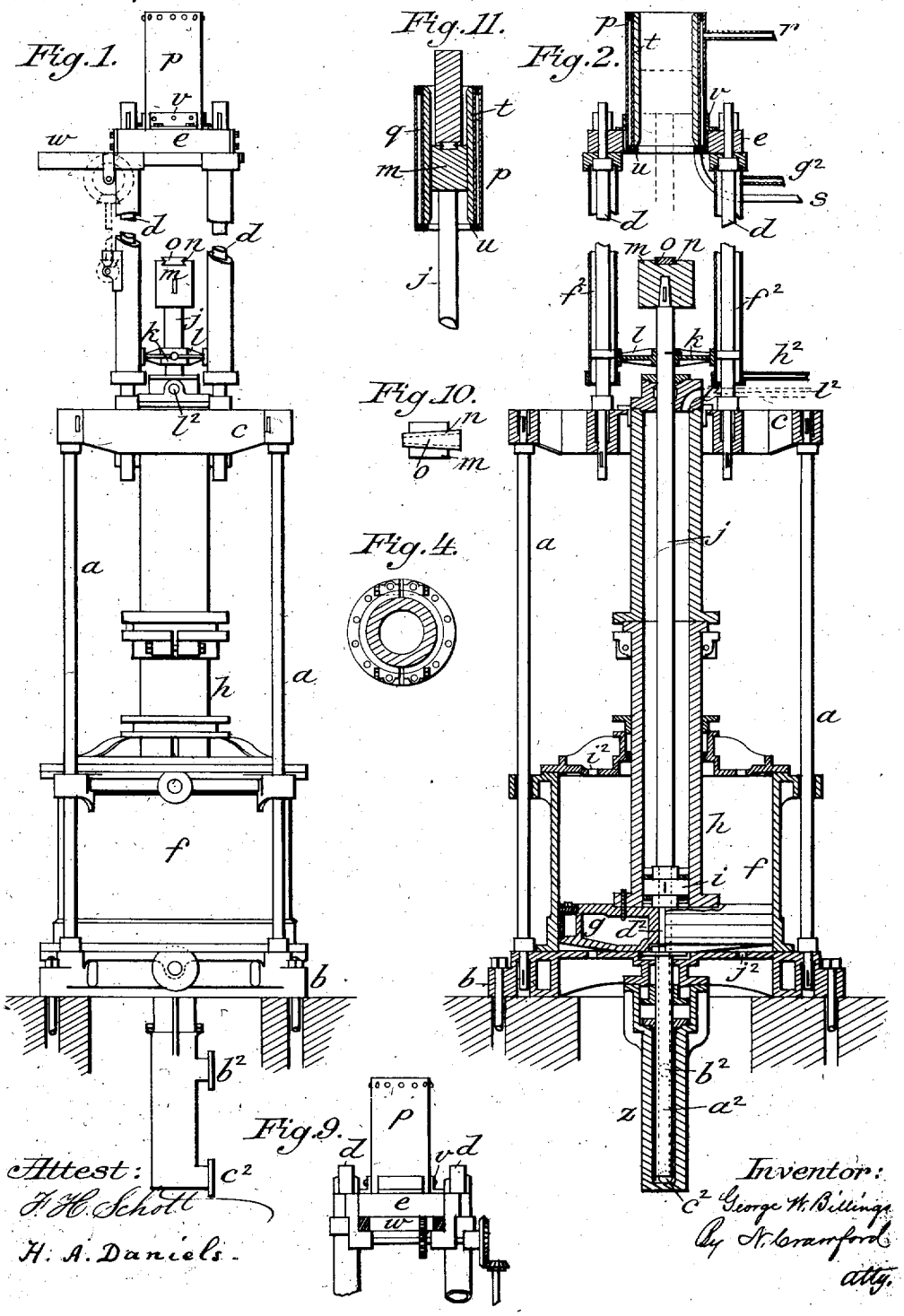
Attest:
H. H. Schott
H. A. Daniels.
Inventor:
George W. Billings
By A. Crawford
Atty.

G. W. BILLINGS.

PROCESS OF AND MACHINE FOR CASTING STEEL INGOTS.

No. 10,082. Reissued Apr. 11, 1882.

Attest:
F. H. Schott
H. A. Daniels.

Inventor:
George W. Billings
By H. Crawford
Atty.

UNITED STATES PATENT OFFICE.

GEORGE W. BILLINGS, OF CLEVELAND, OHIO.

PROCESS OF AND MACHINE FOR CASTING STEEL INGOTS.

SPECIFICATION forming part of Reissued Letters Patent No. 10,082, dated April 11, 1882.

Original No. 253,176, dated February 7, 1882. Application for reissue filed March 2, 1882.

*To all whom it may concern:*

Be it known that I, GEORGE W. BILLINGS, a citizen of the United States, residing at Cleveland, in the county of Cuyahoga and State of Ohio, have invented certain new and useful Improvements in the Process of and Machine for Casting Steel Ingots; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

It is well known to steel-manufacturers that all steel ingots, but especially those having a greater area in cross-section than twenty-five square inches, contain blow-holes or cavities to a greater or less extent, and the larger the ingot the more numerous and the larger the cavities. This unsound or porous condition of the ingot renders a large part of it unfit for use; or, if susceptible of use, it is only as inferior metal, by reason of the crystals that compose the upper part of the ingot not being brought into close contact, so as to weld them together.

The object of my invention is to overcome this defective character of steel ingots; and it consists of the process and machine by which I produce a sound or solid ingot, as will be hereinafter described.

Figure 7:
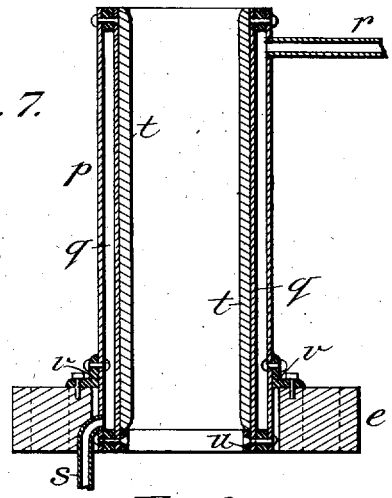
Figure 5:
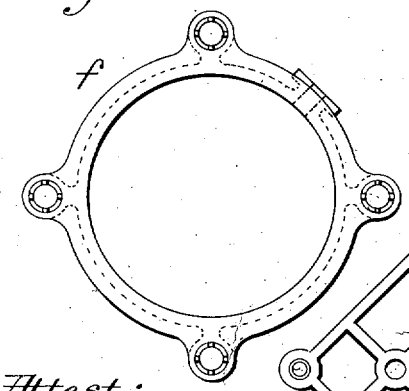
Figure 6:
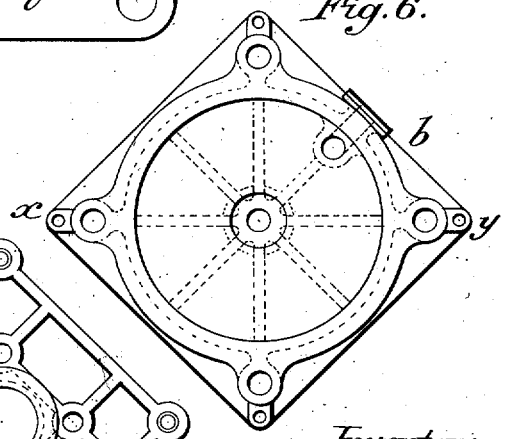
Figure 3:
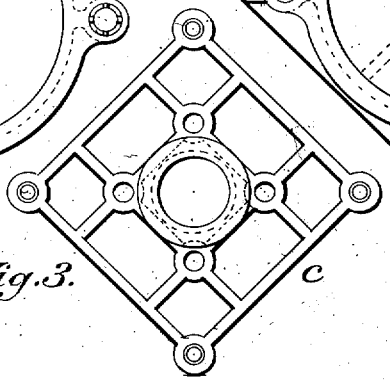

In the accompanying drawings, forming part hereof, Figure 1 is an elevation of the machine; Fig. 2, a vertical section of the same on line *x y* of Fig. 6; Fig. 3, a plan of the tie-frame at the top of the lower tie-rods; Fig. 4, a plan of the sectional flange at the joint in the hydraulic cylinder; Fig. 5, a plan of the top end of the steam-cylinder; Fig. 6, a plan of the bed-plate of the machine; Fig. 7, a vertical section, and Fig. 8 a plan on an enlarged scale of the ingot-mold and of the frame on which it rests; Fig. 9, an elevation of the ingot-mold and of its supporting-frame and of the end of the compression-plate with its friction-rollers; Fig. 10, a plan of the iron block that forms the bottom of the ingot-mold; Fig. 11, a vertical section of the ingot-mold and of the core used in casting hollow ingots.

Similar letters refer to similar parts in the several views.

The frame of the machine is formed in two sections—a lower and an upper section. The lower section consists of four similar wrought-iron columns or tie-rods, each four inches in diameter and twenty-one feet in length, two of them (marked *a*) being shown in Figs. 1 and 2. These rods are securely bolted or keyed to the bed-plate *b* at their lower ends and to the cast or wrought iron frame *c* at their upper ends. The bed-plate *b* rests on solid masonry. The upper section of the frame of the machine is formed of four similar columns or tie-rods, two of them (marked *d*) being shown in Figs. 1 and 2 bolted or keyed at their lower ends to the tie-frames *c* and at their upper ends to a cast or wrought iron tie-frame *e*, Figs. 1, 2, 8, and 9.

*f*, Figs. 1 and 2, is an ordinary steam-cylinder of five feet diameter and four feet stroke.

*g* is the piston in cylinder *f*.

*h* is a cylinder of smaller diameter, bolted at its lower extremity to the piston *g*, and acting as the piston-rod thereto.

*i* is the piston of the smaller cylinder *h*, and *j* is the piston-rod thereto. The cylinder *h* and rod *j* extend through the upper head of the cylinder *f*, as shown in Fig. 2. The rod *j* is secured to the eye of stay *k* by any known device, so as to carry the stay with it in its movement up or down. The stay *k* is connected with the jacketed tie-rods *d*, diagonally situated, by straps *l*, which permit the stay to slide up and down with the rod *j*.

*m* is a solid block of cast-iron keyed or bolted to the upper end of the rod *j*. This block forms the bottom of the ingot-mold when the ingot is being cast therein. The top surface of the block *m* is provided with a dovetailed tapering transverse slot, *n*, Fig. 10, in which slot a key, *o*, is driven. The upper surface of the key *o* projects above the surface of the block *m* and is turned over, all as shown in Fig. 1, forming a projection, around which the metal chills, and by means of this dovetail key the ingot is fastened to said block *m*.

Figure 8:
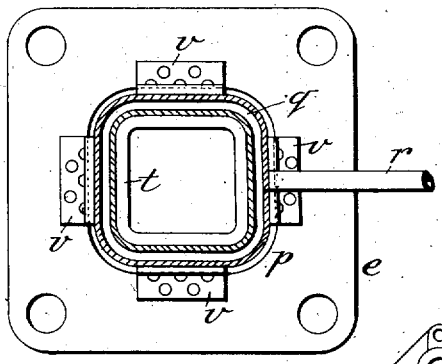

*p* is the ingot-mold, which is here shown to be three and a half feet long and ten inches square inside. It is formed of wrought or cast iron or steel, with rounded corners, as shown in Fig. 8, or in any other form desired. It has double walls, which inclose an annular space, *q*, for water or steam, or both, which is admitted through a pipe, *r*, at top, and is allowed to escape through a pipe, *s*, at the bottom of the mold. The mold is protected inside by a lining, *t*, of black lead or other suitable refractory materials, which lining rests on a ledge or ring, *u*, that is riveted to the mold. The mold *p* is supported in the frame *e* by angle-irons *v*.

*w* is the compression-plate. It consists of a heavy bar of iron or steel, occupying a position immediately under the mold *p*. It is moved into and out of its position under the mold by means of a hand-lever or hook or other device.

Z is a pipe inclosing another pipe, $a^2$, Fig. 2, which is open at its lower end, and attached at its upper end to the steam-cylinder piston *g*, with which it moves up and down. The pipe Z is connected at $b^2$ by means of a pipe, (not shown,) furnished with an ordinary stop-valve, with a supply of water under pressure, and it is emptied at will through a stop-valve at $c^2$.

$d^2$ is an aperture through the steam-cylinder piston *g*. Through this aperture the water from pipe $a^2$ passes through the piston *g* into the hydraulic cylinder *h*, below its piston *i*.

$e^2$ is an aperture for admitting water into the top of cylinder *h*. This aperture is connected with the supply of water under pressure by ordinary flexible pipes (not shown) capable of extension and contraction without severing their connections when the cylinder *h* moves up and down.

Each of the tie-rods *d* of the upper section of the frame is surrounded by an ordinary tubular wrought-iron jacket large enough in diameter to inclose an annular space, $f^2$, for water between it and the rod it surrounds. The several jackets are connected together by pipes (not shown) forming a single system, the water for cooling the tie-rods *d* being introduced anywhere at the top of the jackets, as at cock $g^2$, and being allowed to flow out at the bottom of the jackets through a pipe, as at $h^2$.

In making an ingot I proceed as follows: Water is admitted through the pipe $a^2$ into the cylinder *h*, raising the piston *i* and its rod *j*, and thus carrying the block *m* up until it occupies the position indicated by dotted lines in the mold *p*. The joints between the block *m* and the sides of the mold are stopped with fire-clay or other suitable material, and the molten steel is then poured into the mold from the ladle or furnace in the ordinary way, filling the mold up to within a few inches of its top. The stop-valve $c^2$ is then opened, and the water in the cylinder *h*, below the piston *i*, is allowed to run out gradually, thus lowering the piston-rod *j*, and with it the block *m* and the ingot in process of formation. At the same time the molten metal is being poured into the mold, and the pouring continues until the piston *i* has reached the bottom of cylinder *h*, when the block *m* occupies the position shown in Fig. 2, supporting the ingot, which extends up therefrom nearly to the bottom of the mold, leaving a space between it and the bottom of the mold sufficient for the insertion of the compression-plate *w*, which is then inserted. The key *o* is then driven out of its seat in the block *m*, releasing the ingot from the block. The valve $i^2$ in the steam-cylinder *f* is now opened for the escape of the steam above the piston *g*, and the valve $j^2$ in said cylinder is opened for the admission of steam below the piston *g*, the effect being to lift the piston *g*, and with it the smaller cylinder *h* and its piston-rod *j*, and the block *m*, carrying the ingot up and pressing it with great force against the plate *w*, compressing the ingot to any required extent. Thus, supposing that steam of one hundred pounds to the square inch of the piston *g* is used, a pressure of two hundred and fifty thousand pounds is brought to bear on an ingot of ten inches sectional cross-area. After the ingot has been compressed in the manner described, it is removed, by means of a hydraulic crane, in the usual way.

The machine represented in the drawings is intended for ingots ten or twelve inches square in cross-sectional area and sixteen feet in length before compression; but the machine may be varied in size, as required, for the production of ingots of different lengths and diameters or cross-sectional area.

To prevent buckling of the ingot when it is being compressed, guides or stays supported from the tie-rods may be placed at different points along the length of the ingot when the ingot is ready for compression and before the compression, and these guides may be afterward removed before bringing the block *m* up again into its position in the mold preparatory to casting another ingot.

In casting ingots of large diameter, if cores are required they can be placed inside the mold on the block *m*, as shown in Fig. 11. These cores may be formed in one sufficiently long piece, or they may each be composed of sections, the bottom section in this case being placed in the mold before the pouring begins and its length increased by adding other sections to it as the pouring proceeds.

In casting steel ingots in an ordinary mold the mold rests on a solid stationary plate of iron or steel, which plate forms the mold's bottom. With such a mold it has not been found practicable to make ingots exceeding five feet in length, for the reason that if the metal is poured into the top of the mold the top end of the ingot is rendered unsound and unfit for use unless my method of compression and welding is used at the proper instant; and if the metal is introduced into the mold through the bottom by means of a sprue the metal will not rise beyond a certain point before cooling, while at the same time a large amount of metal remains in the sprue and is lost as waste at each cast or pouring.

I am aware that a moving plunger has been used and operated by the slow action of hydraulic power, which is not quick enough in its action to produce the result obtained in my invention, in which live steam actuates a plunger or presser, as steam acts with greater celerity than water; and in order to compress or weld the semi-fluid metal together in the ingot but a few seconds of time is passed before the metal is solidified by cooling, and the particles of metal will not thereafter unite and adhere or weld together.

Having thus described my invention, what I claim, and desire to secure by Letters Patent, is—

1. The process of forming solid cast-steel ingots by pouring the molten steel into a mold, then gradually lowering the ingot until it has acquired the length desired, then reversing the movement of the ingot upward and compressing the ingot lengthwise, substantially as set forth.

2. In a machine for casting and welding solid steel ingots, the combination of the mold *p*, cylinder *h*, reciprocating piston-rod *j*, having block *m* and dovetail key *o* thereon, with means, such as described, for lowering the piston-rod and the ingot thereon, substantially as set forth.

3. In a machine for casting and welding solid-steel ingots, the combination of the mold *p*, steam-cylinder *f*, its piston *g*, cylinder *h*, piston-rod *j*, having block *m* and dovetail key *o* thereon, and the movable compression-plate *w*, substantially as and for the purposes described.

4. The steam-cylinder *f* and its piston *g*, the water-cylinder *h* and its piston-rod *j*, in combination with an ingot-mold bottom, a separate bottomless ingot-mold, and an adjustable compression-plate, substantially as and for the purpose set forth.

5. The ingot-mold *p*, in combination with a bottom, *m*, having the dovetail key *o* thereon, which reciprocates within the mold, receives upon its top the molten steel, and supports the ingot while being formed, substantially as set forth.

In testimony whereof I affix my signature in presence of two witnesses.

GEO. W. BILLINGS.

Witnesses:
D. W. DAVIS,
J. MASON GOSZLER.